Jan. 23, 1962   D. H. GATTONE   3,018,313
LIGHT GATHERING POWER CONVERTER
Filed Jan. 4, 1961   2 Sheets-Sheet 1
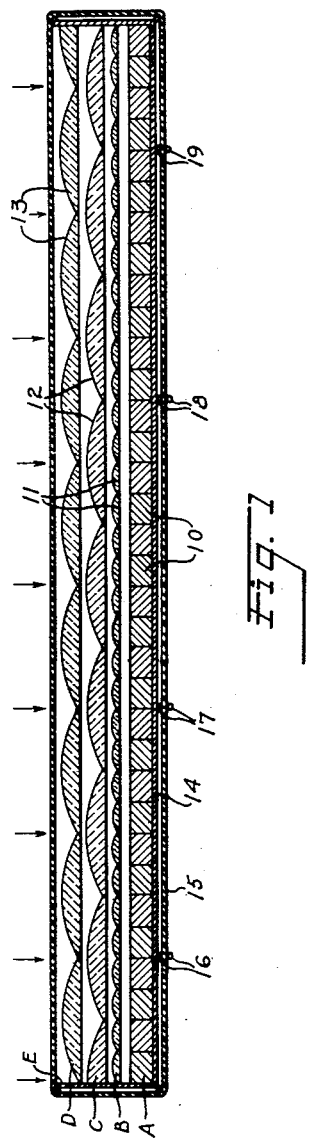
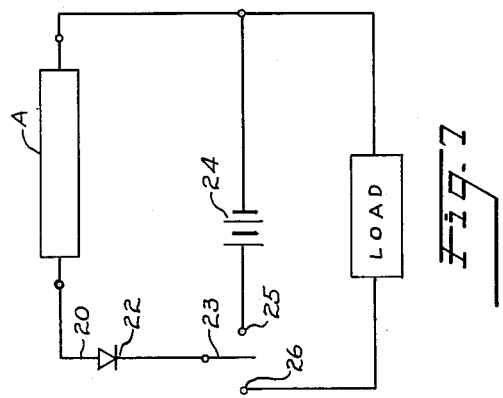
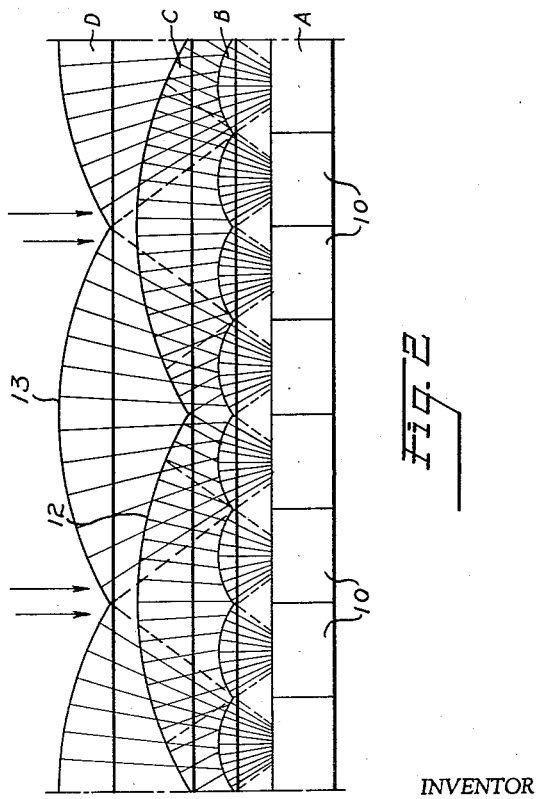
INVENTOR
DANIEL H. GATTONE
BY *Herbert M. Birch*
ATTORNEY

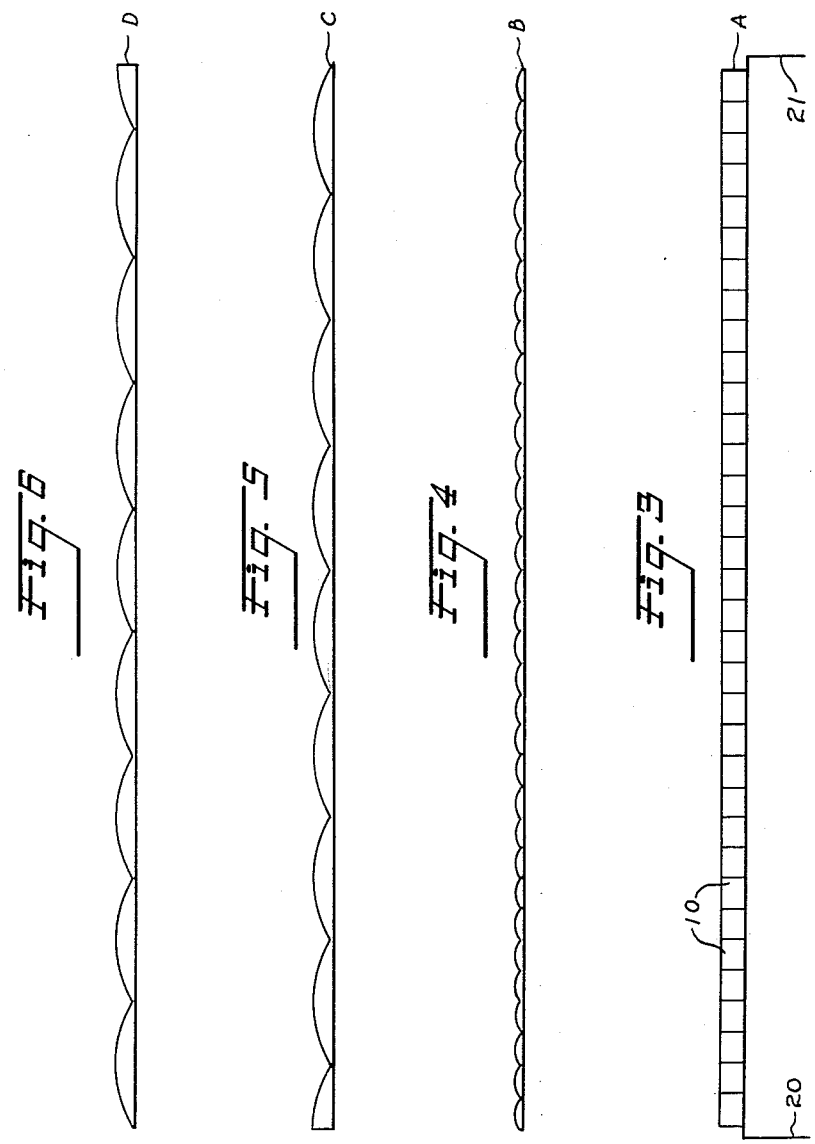

3,018,313
LIGHT GATHERING POWER CONVERTER
Daniel H. Gattone, 4409 Dermond Road, Drexel Hill, Pa.
Filed Jan. 4, 1961, Ser. No. 80,686
7 Claims. (Cl. 136—89)

My present invention relates broadly to the conversion of light into electric energy. More particularly my invention relates to an array of lenses for receiving, concentrating and impinging light waves in convergent paths toward a focal point onto the surfaces of light sensitive cells to develop very high values of light flux and resultant electrical energy.

Heretofore light sensitive materials having pronounced photoconductive properties, such as silicon devices or like photovoltaic semi-conductor devices characterized by a P-N junction have been positioned to receive impinging light concentrated from a single lens to produce electric voltage. However, such single lens and single cell arrangements are limited in their potential of electric energy development, because such single lens and single cell arrangements reach their respective saturation levels before sufficient electric energy is developed to provide for extensive commercial use.

Accordingly, it is an object of this invention to provide a novel array of light collector and concentrator means adapted to impinge incident light onto the most effective areas of pluralities of electrically connected light sensitive cells adjacently arranged in a co-planar plane.

A further object of this device is to provide a light concentrating means comprised of a cascade arrangement of superimposed plates formed with light convergent lenses, adapted to be positioned above a group of series connected light sensitive cells, whereby the focal points of each of the respective convergent lenses may be directed through the P-N junctions of the respective cells.

Another object is to provide a light intensifying arrangement of plates formed with lenses each of the plates having lens of different dimensions from the lenses of the other plates for selective light impingement on each cell and additively on two or more adjacent cells of pluralities of series connected light sensitive voltage producing cells, whereby such selective and additive impingement develops increased voltage and current amperage for the maximum power potential of said cells.

Still a further object is to provide a laminate of superimposed transparent sheets formed with convergent lenses on a surface thereof, whereby the lower sheet is formed of uniform convergent lenses of smaller dimensions than the respective lenses formed in the upper sheets, whereby light is selectively and additively impinged on said cells.

A further object is to provide a power pack unit comprising layers of lenses arranged in cascade over a layer of light sensitive cells enshrouded within the confines of a flexible transparent protective movable cover.

With the above and other objects in view, the invention consists in the construction, arrangement and combination of elements hereinafter described and particularly pointed out in the claims, it being understood that I do not intend to limit the same to the details of such construction, arrangements and combinations.

In the drawings like parts throughout the several views are given like reference characters and are thus identified in the following detailed description:

FIGURE 1 illustrates a completely assembled embodiment of my invention, including a cascade lens arrangement over a group of light sensitive cells with a rotatable enshrouding transparent protective cover;

FIGURE 2 is an enlarged view of a section of the lens and light sensitive cells, showing how the light is converged and concentrated selectively and additively to focal points onto each respective cell surface;

FIGURE 3 shows a layer or strip of series connected light sensitive cells;

FIGURE 4 shows a plate of transparent media formed with a series of lenses, for example, one lens for each cell to be impinged;

FIGURE 5 shows a second plate of transparent media formed with a series of lenses, each lens being relatively longer than each lens of FIGURE 4 for light impingement on two or more cells;

FIGURE 6 shows a third plate of transparent media, formed with a series of lenses of a size equal to each lens of the second plate of FIGURE 5, but each lens of the third plate having its focal line offset from the focal line of each lens of the second plate when superimposed as shown in the enlargement in FIGURE 2 for light impingement on two or more cells, and FIGURE 7 is a dagrammatic illustration of a functioning electric circuit including the present power pack unit.

Referring to the drawings and first with with particular reference to FIGURES 1 and 2, there is illustrated one assembled embodiment of my invention as a unit comprising a plurality of light sensitive cell devices 10 arranged in a series connected layer or strip A, a plurality or group of convergent lens members 11 formed from a sheet of transparent media, in the provision of a plate B, each lens of which is superimposed above a respective lower adjacent cell device 10 for selective light impingement per lens per cell. Superimposed in a plane above the lenses 11 of plate B is a second group of convergent lens members 12 large enough to span an area over four of the relatively smaller lenses 11. Lenses 12 are formed from a sheet of transparent media in the provision of a plate C; and still further, superimposed in a plane above the lenses 12 of plate C is a third group of convergent lens members 13 of a size preferably equal to lens members 12, but formed from a sheet of transparent media in the provision of a third lens plate D. The plate D is in a predetermined arrangement with respect to the second lens plate C, whereby the center of the convex portion of each lens 12 of plate B is the starting or ending junction of the arcuate curve defined by the convex light converging portion of each respective upper lens 13 of plate C.

Each of the elements A, B, C and D may be supported in a holding box E open at the top and formed with a bottom 14 whereby the components of the elements are exposed to incident light, as shown by the directional arrows in FIGURES 1 and 2

Enshrouding the box E is a rotatable endless transparent plastic belt 15. This belt serves to protect the elements within the box E from exposure to dirt and foreign matter likely to interfere with the efficient passage of light waves through the lens plates B, C and D to be impinged selectively on each cell by lenses 11 of plate B and additively by the lenses 12 and 13 of plates C and D upon the light sensitive cells 10 of layer A. In order to keep the transparent plastic belt 15 clean, sets of vertically spaced soft brushes 16, 17, 18 and 19 are suitably secured to the bottom 14, of the box E to wipe the belt clean, when the same is manually rotated around the box, as required for this purpose.

Illustrated in FIGURE 3, is the layer A of light sensitive cells 10. For example, these cells may be connected in series and by leads 20 and 21 to output circuits. Thus the lead 20 connects to a two-position switch 23 from a rectifier 22. This switch may lead to a voltage storage device, such as a battery 24 by closing with a contact 25 or the electric energy of the cells may go direct to lead, as shown upon closing the switch to a contact 26. The voltage in the battery may be used for any suitable purpose.

In FIGURES 4, 5 and 6 the lens plates B, C and D are illustrated with their respective converging lenses, which are shown assembled as a power pack unit in FIGURES 1 and 2.

Again referring to FIGURE 2, the operation of the superimposed lens plates B, C and D over the light sensitive cells 10, illustrates the selective and additive light converging action of the several cascaded convergent respective lens members 11, 12 and 13. For example, the directional arrows in FIGURES 1 and 2 represent the incident light and the dotted lines represent the outline of the converging bundle or path of light waves as they are selectively and additively impinged upon the cell surfaces during their convergence toward their respective focal points, which points if visible would be on a focal line below lower side of the cells.

As the light passes through the lenses 13 of the uppermost lens plate D, the same converges and selectively impinges onto the surface of two adjacent cells, which said two cells 10 each also receive a further additive concentration of light into the focal path of light passing through said lens 13 from at least two of the adjacent lenses 11 of lens plate B. Then the lenses 12 of lens plate C, which are each alternately spaced with respect to each of the lenses 13 of upper plate D cause convergence and selective impingement of light upon two adjacent cells 10 in alignment with the said first-mentioned two cells, which are selectively light impinged by the said respective upper lens 13, whereby the said lenses 12 and 13 selectively impinge light on four aligned adjacent cells. Also, said lens 12 of plate C includes a further additive concentration of light waves from two relatively narrower converged paths into the relatively wider focal path of light passing through said lens 12 from two of the next adjacent relatively smaller lenses 11 of plate B. Thus incident light is intensified and impinged onto the surface of the cells 10 of layer A by the cascade of one of lenses 13 of lens plate D with the additive action of two adjacent lenses 11 of plate B, and incident light is intensified and impinged onto the surface of the next two adjacent cells 10 of layer A by the cascade of one of lenses 12 of lens plate C with the additive action of two adjacent lenses 11 of plate B.

Thus by intensification of light by a cascade of lenses each of which additively feeds into the next in succession provides a resultant increase of light impingement per cell area and thereby increases the light flux and the magnitude of each respective light sensitive cell output in the respective selective and additive convergent focal paths of each of said respective lenses and lens cascade combinations.

Without further description and disclosures, it is believed that the foregoing description and accompanying drawing are sufficiently clear for others skilled in the art to understand this invention and to become aware of the many uses to which the present novel device may be applied. Although only one embodiment of my invention has been illustrated and described in detail, it is to be expressly understood that the same is not intended to be limited to any particular arrangements of cells, lenses or lamination of plates and cell layers. For a definition of the limits of my invention, reference should be had to the appended claims.

What I claim is:

1. A power pack unit for converting light into electric energy comprising a plurality of superimposed plates formed with light convergent lenses arranged in cascade, a plurality of series connected light sensitive voltage producing cells positioned below said lenses, a holder for said plates, whereby said light convergent lenses are positioned for selective light impingement on each of said cells, and a protective transparent elongated covering extending around the said holder and over the said lenses.

2. A light conversion to electric energy unit comprising a laminae of plates formed of transparent media, said plates having convergent lenses arranged in cascade formed on the surface thereof, and a layer of series connected light sensitive voltage producing cells positioned below said lens plates, said plates being superimposed in such a manner that said lenses selectively and additively impinge light on single adjacent lenses and on two or more adjacent lenses of the lower plate to each respective lens adjacent light sensitive voltage producing cell of said series connected layer of cells.

3. A light conversion to power lens systems comprising a transparent plate formed with convergent lenses, and a second transparent plate formed with relatively larger convergent lenses, said lenses of the second plate serving to concentrate light in a converging path toward a focal point, and pairs of said lenses of said first plate each serving to receive and further concentrate said light from said converging path of one of said lenses of said second plate, to thereby selectively and additively impinge said concentrated light onto a photoconductive surface, said photoconductive surface comprising a plurality of series connected light sensitive voltage producing cells.

4. A light conversion to power lens system as described in claim 3, wherein said system includes a third transparent plate formed with lenses equal in dimensions to the lenses of said second plate, said lenses of said third plate having their respective focal axes each equally spaced and offset with respect to the respective focal axes of the lenses of the said second plate.

5. A power pack unit comprising superimposed layers of convergent lenses arranged in cascade and a layer of series connected photovoltaic semi-conductor devices characterized by a P-N junction, said devices being positioned to be selectively impinged by converging light along a focal axis directed into the vicinity of said P-N junction of each semi-conductor device.

6. A power pack unit as described in claim 5, wherein the said devices are silicon semi-conductor devices.

7. A power pack unit as described in claim 5, wherein the said layers are superimposed in a holder having an open top for exposure to incident light, said holder being enshrouded within the confines of a transparent plastic belt, and cleaning means for said belt mounted on a side of said holder, said belt being movable between said cleaning means.

References Cited in the file of this patent

UNITED STATES PATENTS

| | | |
|---|---|---|
| 2,067,843 | Tonnies | Jan. 12, 1937 |
| 2,298,667 | Weymouth | Oct. 13, 1942 |
| 2,560,606 | Shive | July 17, 1951 |
| 2,588,254 | Lark-Horovitz | Mar. 4, 1952 |
| 2,641,712 | Kircher | June 9, 1953 |
| 2,788,381 | Baldwin | Apr. 9, 1957 |
| 2,904,612 | Regnier | Sept. 15, 1959 |
| 2,946,945 | Regnier et al. | July 26, 1960 |